(12) United States Patent
Fishman et al.

(10) Patent No.: US 7,293,383 B2
(45) Date of Patent: Nov. 13, 2007

(54) IDENTIFICATION CASE

(76) Inventors: Marie T. Fishman, 2551 E. Brentwood Dr., Salt Lake City, UT (US) 84121; Jeff J. Fishman, 2551 E. Brentwood Dr., Salt Lake City, UT (US) 84121

( * ) Notice: Subject to any disclaimer, the term of this patent is extended or adjusted under 35 U.S.C. 154(b) by 315 days.

(21) Appl. No.: 11/145,369

(22) Filed: Jun. 3, 2005

(65) Prior Publication Data

US 2005/0242137 A1    Nov. 3, 2005

Related U.S. Application Data

(63) Continuation-in-part of application No. 10/939,108, filed on Sep. 11, 2004, now Pat. No. 7,124,527, and a continuation-in-part of application No. 10/617,216, filed on Jul. 8, 2003, now Pat. No. 6,944,985.

(51) Int. Cl.
*A61B 5/117* (2006.01)
(52) U.S. Cl. ........................................... 40/633
(58) Field of Classification Search ................... 40/1.6, 40/633, 654, 665
See application file for complete search history.

(56) References Cited

U.S. PATENT DOCUMENTS

| | | |
|---|---|---|
| 2,073,280 A | 3/1937 | Lederer |
| 2,599,311 A | 6/1952 | Anderson |
| 2,749,634 A | 6/1956 | Billet et al. |
| 2,996,899 A | 8/1961 | Donle |
| 3,330,057 A | 7/1967 | Rodgers |
| 3,526,985 A | 9/1970 | Rieth |
| 3,645,023 A | 2/1972 | Larson |
| 3,685,107 A | 8/1972 | Epaird |
| 3,771,717 A | 11/1973 | McDermott et al. |
| 3,810,566 A | 5/1974 | Adams |
| 4,199,882 A | 4/1980 | Clayman |
| 4,226,036 A | 10/1980 | Krug |
| 4,387,489 A * | 6/1983 | Dudek .......................... 24/133 |
| 4,770,008 A | 9/1988 | Yamaura |
| D316,983 S | 5/1991 | Houlihan |
| 5,283,969 A | 2/1994 | Weiss |
| 5,493,805 A | 2/1996 | Penuela et al. |
| 5,499,468 A | 3/1996 | Henry |
| 5,577,007 A | 11/1996 | Houlihan |
| 5,649,381 A | 7/1997 | Studer |
| 5,765,875 A | 6/1998 | Rowley |
| 5,979,095 A * | 11/1999 | Schneider et al. ............ 40/633 |
| 6,085,449 A | 7/2000 | Tsui |

(Continued)

*Primary Examiner*—Lars A. Olson
(74) *Attorney, Agent, or Firm*—Thorpe North & Western LLP

(57) ABSTRACT

An information case for protectively storing information related to an individual includes a base having a cavity defined therein. The cavity can be configured to store and protect an information-bearing medium on which the information related to the individual can be disposed. A strap assembly can have at least a strap member. Attachment means for receiving the strap member can be coupled to at least one end of the base body. A lid having one of a retention nub and a compliant latch attached thereto can be hingeably connected to the base. Another of the retention nub and the compliant latch can be attached to the base and can be configured to interlock with the retention nub or the compliant latch of the lid to provide selective closure of the lid over the cavity in the base.

20 Claims, 5 Drawing Sheets

U.S. PATENT DOCUMENTS

| | | |
|---|---|---|
| 6,186,552 B1 | 2/2001 | Seabrook |
| 6,305,329 B1 | 10/2001 | Levy, Jr. |
| 6,510,988 B1 | 1/2003 | Kraus |
| 6,631,538 B1 | 10/2003 | Carr |
| 6,944,985 B2 * | 9/2005 | Fishman ................. 40/633 |
| 7,124,527 B2 * | 10/2006 | Fishman et al. .......... 40/633 |
| 2003/0046797 A1 | 2/2003 | Buettell |
| 2005/0235539 A1 * | 10/2005 | Story ..................... 40/633 |

* cited by examiner

IDENTIFICATION CASE

This is a continuation-in-part of U.S. patent application Ser. No. 10/617,216, filed Jul. 8, 2003, now U.S. Pat. No. 6,944,885 and U.S. patent application Ser. No. 10/939,108, filed Sep. 11, 2004, now U.S. Pat. No. 7,124,527 each of which are hereby incorporated herein by reference.

BACKGROUND OF THE INVENTION

1. Field of the Invention

The present invention relates generally to a case for storing information relating to an individual wearing or bearing the case.

2. Related Art

It is often the case that it is desirable to include information on an individual relating to that individual. For instance, children are often unable to remember information such as their address, telephone number, etc., that may be necessary for third parties to ascertain in the event of some problem. This can be problematic if a child becomes lost and may be unable to provide accurate identification information to people such as police who are attempting to locate the parents or caretaker of the child. This problem can be further exacerbated when the child is involved in a stressful situation, such as suffering an injury or being involved in accident, in which case even children normally capable of recalling and providing such information may be unable to do so.

Similar problems are also shared by aging adults or those with particular medical conditions. For instance, it is recommended that people of all ages with certain medical conditions include information on their person identifying the medical condition. In this manner, emergency or medical personnel can be made aware of such information and treat the individual accordingly. In addition, active adolescents and adults often participate in outdoor and recreational activities in which carriage of wallets, purses, etc., is not convenient. In the event that such individuals become injured, it can be difficult, if not impossible, for emergency personnel to identify the individual and/or ascertain who should be contacted to report the injury, i.e., the individual's parents, spouse, etc. Also, pets at times become lost or separated from their human caregivers and are, of course, generally incapable of providing information relating to home address, name of caregiver, etc.

For these reasons, persons with medical conditions, caretakers of pets, children or older adults, and active adolescents and adults (collectively referred to as "individuals") often wish to provide information relating to the individual in a manner that can be accessed by third parties in the event that the individual is unable to provide the information themselves. This can most effectively be done by providing and storing the information on the person of the individual.

Providing information relating to an individual on the person of the individual can be done in a number of ways. For instance, the individual can be provided with a card or other paper on which the information is written and the card or paper can be stored in the individual's pocket or purse. While this information may be useful by third parties in the event that it becomes necessary, third parties may have no knowledge of the existence of such a paper and may not think to search for something of the kind.

In addition, the individual may not know of or be able to understand the importance of such a card or paper and may discard or otherwise lose the paper. For these reasons, devices such as "medical alert" jewelry have been developed on or in which such information can be disposed. If the individual wearing such a device continues to wear the device, and in the event that such a device can store sufficient information to be of use, these conventional methods of identification provide some limited benefits.

However, conventional identification devices have proved problematic in a number of ways. For instance, many individuals who are provided and/or instructed to wear such devices resist doing so and may remove the device when unattended. This can be especially the case with young children, who may not wish to wear a device that other children are not wearing or that, in the child's opinion, is not "cool," or attractive enough to warrant continued use, or that is uncomfortable or overly heavy to wear. Also, conventional "medical alert" jewelry has proved to be limited in the amount and current status of information that can be displayed. For instance, many conventional jewelry identification devices are engraved with information, which results in a limited amount of information being recordable on the device. In addition, once engraved on the device, it is difficult, if not impossible, to update the information to maintain a current status of the information.

Many of the same problems are involved when attempting to store information relating to an animal, such as a family pet, on a body of the animal. While conventional tags, commonly known as "dog tags" have been used to record information relating to a pet, such as the pet's name, owner's address and telephone, etc., such tags are limited in that only a small amount of information can be recorded on typical dog tags. In addition, as pets are likely to chew or otherwise attempt to remove objects attached to the pet, attempts to attach larger devices containing more detailed levels of information have proved problematic.

For at least these reasons, conventional identification devices are not particularly suited for storing or updating complete identification information, such as addresses, telephone numbers, caretaker names and contact information, etc. Such devices are often limited to providing only a limited, basic amount of information, and not detailed information such as third party contact information, office contact information, variable locations (alternative), etc. Furthermore, even if conventional identification devices can be provided with a desired amount of information, many people are reluctant to wear such devices as they may appear unattractive or out of step with current trends, or may be uncomfortable, heavy, or bulky to wear.

SUMMARY OF THE INVENTION

It has been recognized that it would be advantageous to develop a device that enables information relating to an individual to be protectively stored upon the person of the individual. The invention provides an information case for protectively storing information related to an individual, including a base having a cavity defined therein. The cavity can be configured to store and protect an information-bearing medium on which the information related to the individual can be disposed. A strap assembly can have at least a strap member. Attachment means for receiving the strap member can be coupled to at least one end of the base body. A lid having one of a retention nub and a compliant latch attached thereto can be hingeably connected to the base, and another of the retention nub and the compliant latch can be attached to the base and can be configured to interlock with the retention nub or the compliant latch of the lid to provide selective closure of the lid over the cavity in the base.

In accordance with another embodiment of the invention, an information case for protectively storing information related to an individual is provided, including a base having a cavity defined therein, the cavity being configured to store and protect an information-bearing medium on which the information related to the individual can be disposed. Attachment means for attaching the case to an article can be coupled to at least one end of the body. A lid can have one of a retention nub and a compliant latch associated therewith and can be hingeably connected to the base, and another of the retention nub and the compliant latch can be connected to the base and can be configured to interlock with the retention nub or the compliant latch of the lid to provide selective closure of the lid over the cavity in the base.

Additional features and advantages of the invention will be apparent from the detailed description which follows, taken in conjunction with the accompanying drawings, which together illustrate, by way of example, features of the invention.

DETAILED DESCRIPTION

Figure 1:
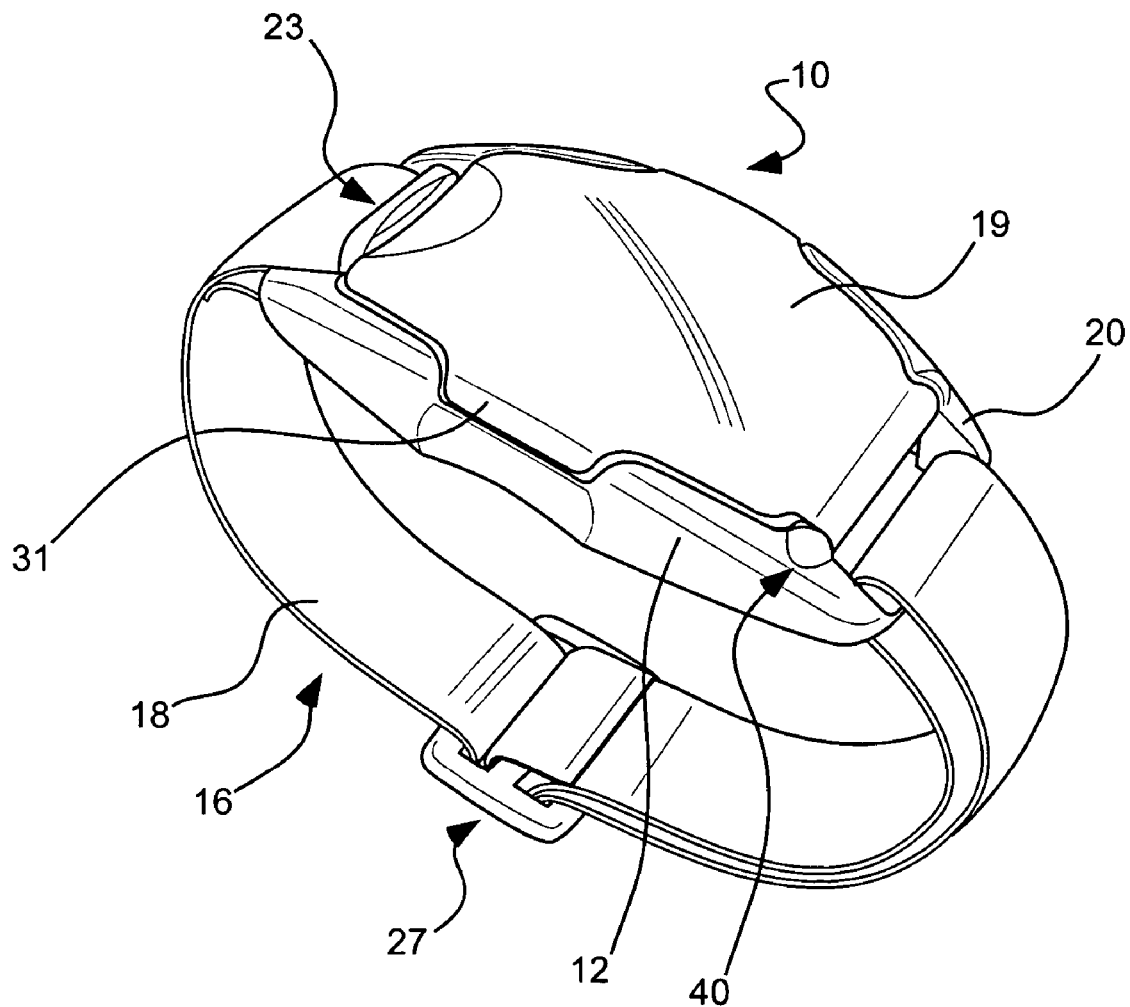
FIG. 1 is a perspective view of an identification case in accordance with an embodiment of the present invention, having a securing strap attached thereto.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
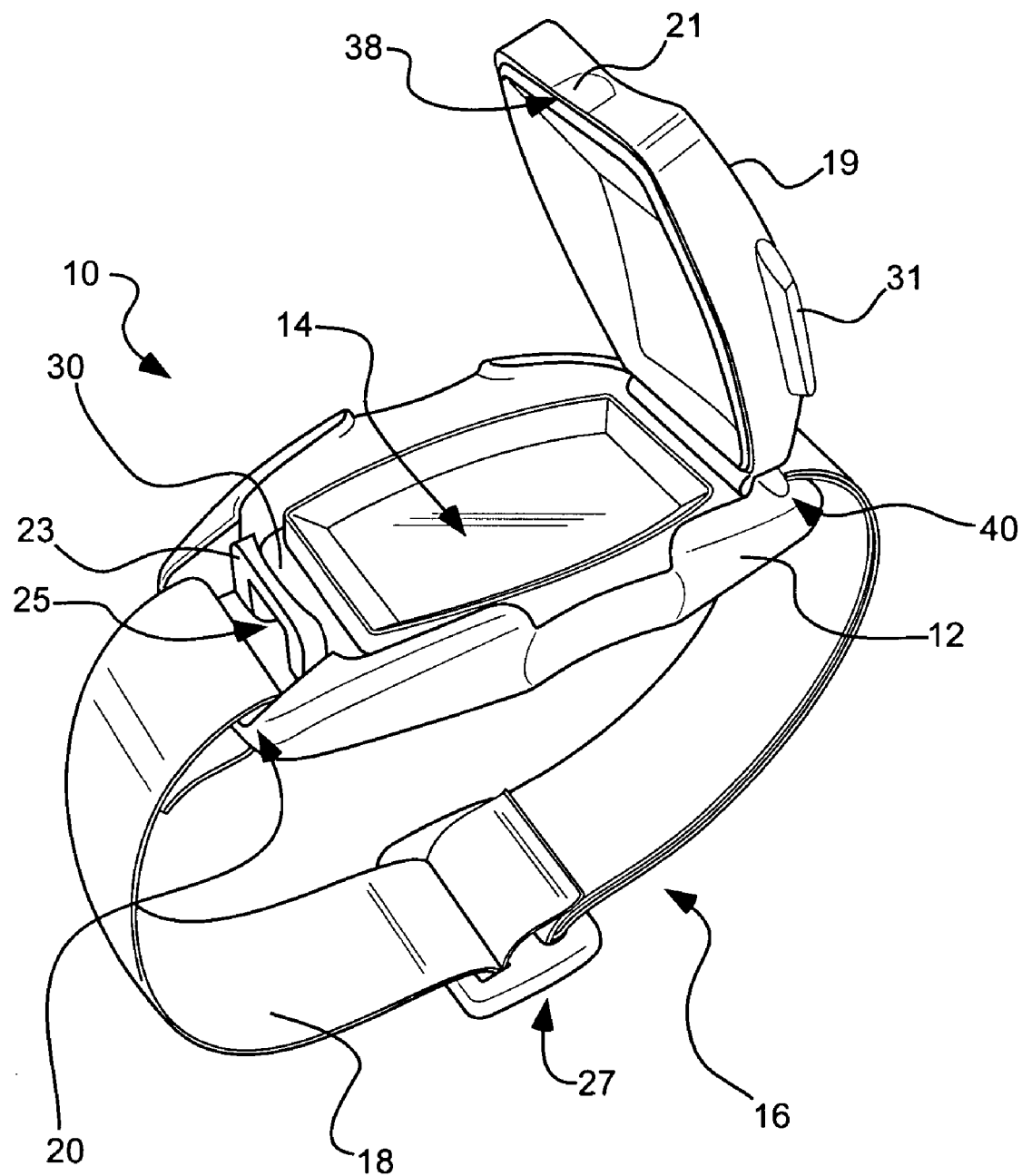
FIG. 2 is a perspective view of the identification case of FIG. 1, shown in an open configuration.

As illustrated in FIGS. 1 and 2, an identification or information case, indicated generally at 10 is provided in accordance with one aspect of the present invention. The information case can include a body 12 which has a cavity (14 in FIG. 2) defined therein. The cavity can be configured to store and protect an information-bearing medium (shown by example at 50 in FIG. 5) on which the information related to the individual can be disposed.

A lid 19 (shown in a closed configuration in FIG. 1 and in an open configuration in FIG. 2) can be hingedly coupled to the body 12 and can include one of: a retention nub 21 and a compliant latch 23 attached thereto. Another of the retention nub and the compliant latch can be attached to the base and can be configured to interlock with the retention nub or the compliant latch of the lid to provide selective closure of the lid over the cavity in the base. As will be appreciated, in the embodiment of the invention illustrated in FIGS. 1 and 2, the retention nub is attached to the lid while the compliant latch is attached to the base. However, it is contemplated that the positions of the latch and the nub can be reversed: with the nub being attached to the base and the compliant latch being attached to the lid.

A strap assembly 16 can also be provided and can include an adjustable strap member 18. The body of the case can include attachment means 20 for receiving the strap member. The attachment means can include a slot or hole through which the strap member can be disposed. By disposing the strap member through the slot or holes in the body, the strap member can be rotatable with respect to the body to provide a more comfortable fit on or over a person's wrist, ankle or other suitable anatomy. Thus, in the embodiment shown, the case and strap member collectively define a bracelet that can be worn and can provide an aesthetically pleasing appearance while also facilitating storage of information relating to an individual on the person of the individual.

The strap member 18 can be of a variety of types, including a generally flat configuration, similar to a band of a wristwatch. In this aspect, the strap can include a buckle 27, or other attachment means or devices, to enable the strap to be attached to and adjusted for a particular wearer. The strap member can be formed of an elastic material that can expand to allow an individual's hand to pass through the strap, and contract upon the individual's wrist to secure the bracelet to the individual.

The identification case can be utilized by a variety of individuals in various situations. For example, when the case is incorporated into a bracelet the bracelet can be provided to children with information relating to the child disposed on the information-bearing medium stored in the cavity of the bracelet. The information relating to the child can then be easily accessed by police, emergency personnel, or other third parties in the event the child becomes lost or is injured. As used herein, the term "information relating to an individual" is meant to include a variety of information related to an individual, including, without limitation: identification information, such as name, address, home telephone number, office telephone number, cellular telephone number, etc.; health information, such as current or past medical conditions; medication information, including current medications which the individual is taking and allergies to other medications and foods; scheduling information, such as appointments the individual must keep or addresses at which the appointment must be kept; and third party contact information, such as names, telephone numbers and addresses of parent, spouse, guardian or caretaker, school or institution with which the individual is associated, etc.

As used herein, the term "individual" is to be understood to refer to humans of a variety of ages and physical conditions as well as animals. The term individual can refer to, for example, a family pet to which identification information can be attached in the event the pet becomes lost or is injured. Thus, in the case where the information case is referred to as being "stored upon the person of the pet," it is to be understood that the information case is either attached directly to the pet or is attached indirectly to the pet via some other structure on the pet, such as a leash, collar, pack, etc.

The present invention thus allows a great deal of pertinent information relating to the individual to be protectively stored upon the person of the individual. While beneficial for children, the present invention is not limited to use by young children, but can be used by a variety of individuals, including adults and pets. The case can be advantageously used by aging adults, who may have difficulty remembering particular information, or by those with medical conditions that should be made known to emergency personnel and others. Also, active adults or adolescents participating in sporting events, such as bicycling, jogging, etc., can benefit from use of the case, as they may not wish to carry extraneous objects such as wallets and purses when jogging or biking, but would nonetheless like to carry their personal information for emergency purposes.

The identification case 10 can be formed from a variety of materials, and in one aspect various components of the case are formed from polypropylene, polyethylene, ABS plastic, nylon, etc. In one embodiment of the invention, the body 12 is formed of nylon and the lid 19 is formed from ABS plastic.

The compliant latch 23 can be configured in a number of manners to provide both a secure method of securing the lid 19 onto the body 12 and over the cavity 14 while also allowing an operator to relatively easily open the lid when desired. While the compliant latch is relatively easy to open by an operator, the present invention has been found to provide a closure over the cavity that maintains a substantially water-tight environment within the cavity. Toward this end, the case can include a seal or gasket 30 that can be disposed on or in either the base 12 or the lid 19 to provide a substantially water-tight or water-resistant seal around at least a portion of the cavity. The seal or gasket can be formed from a number of materials, as would occur to one skilled in the relevant art, including, without limitation, synthetic rubber or silicone. In this manner, in the event that the individual wearing or bearing the case exposes the case to a wet environment, the information disposed on the information-bearing medium can be protected from exposure to water and other contaminants.

The compliant latch 23 can include a notch 25 within which the retention nub 21 can nest when the case is in the closed configuration. Similarly, the retention nub can include a lip 38 that can nest securely within the notch 25. In addition, in one aspect of the invention, the compliant latch can include a living hinge formed intermediate the compliant latch and the base. Living hinges, generally known to those of ordinary skill in the art, include a narrowed section of polymer in which plastic fibers or molecules are oriented orthogonally to the bending axis of the hinge to provide a hinge that can flex as many as millions of times before failing. Thus, in this aspect of the invention, the compliant latch is at least partially formed of a material having plastic memory.

The base 12 and lid 19 can be engaged together to thereby cooperatively form the cavity 14. The base and lid can each include a recessed portion, the two of which together define the cavity. Alternately, only one or the other of the base and lid can include a recessed portion that becomes a closed cavity upon mating with the other piece. The lid can include one or more tabs 31 that aid a user in opening the lid from the closed configuration over the cavity. To open the lid, a user will generally flex the compliant latch 23 away from the retention nub 21 while applying a separating force to the tab or tabs to pivot the lid away from the cavity. To enable pivoting of the lid, the lid can include one or a pair of pivot points 40 about which the lid can pivot or rotate relative to the body.

As will be appreciated from the figures, the bracelet provides an easily-identifiable and aesthetically pleasing appearance. It is believed that law enforcement and emergency personnel can be educated to recognize the appearance of the bracelet and immediately associate the bracelet as a source of information relating to the individual wearing the bracelet.

The body 12, lid 19 and strap assembly 16 can be formed of a variety of materials that exhibit a variety of colors and appearances. For instance, to provide a more interesting and fashionable case or bracelet, the components of the bracelet can be made of different colors, and can be interchanged to allow a user to change the bracelet's appearance from one day to the next. This feature can be especially appealing to children, who may as a result view the bracelet as more of an interesting object to wear, and may not be as likely to resist a "requirement" that the bracelet be worn. Also, the colors of the bracelet can be tailored to make the bracelet more appealing to children by selecting a child's favorite color, the colors of the child's school or club, favorite sports team, etc.

Figure 3:
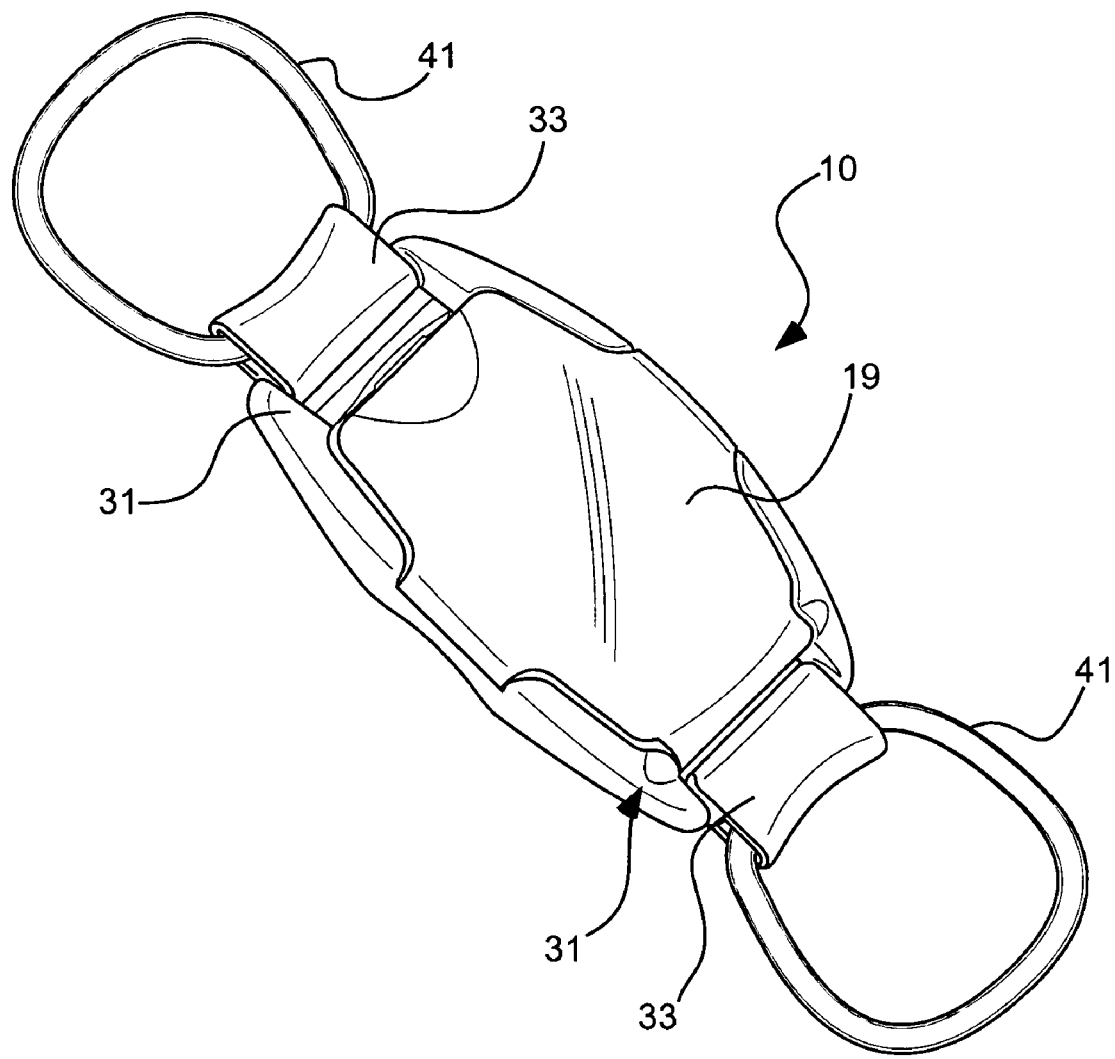
FIG. 3 a perspective view of the case of FIG. 1, with a pair of securing loops attached thereto.

FIG. 3 illustrates another embodiment of the invention in which the case 10 is fitted with a pair of attachment loops 41 that are coupled to the attachment means 31 via a pair of intermediate loops 33. This embodiment of the invention can be particularly useful when it is desired to attach the case to an article that includes some type of securing device that can be interlinked with the attachment loops. For example, the attachment loops can be interlaced with laces of shoes, boots, jackets, etc. In addition, the attachment loops can be interlaced with pet leashes, watchbands, etc.

While the attachment loops 41 can include a variety of configurations and can be formed from a variety of materials, in one aspect of the invention the attachment loops formed closed loops. As used herein, the term "closed loop" is to be understood to refer to a condition in which the loops are not normally openable but form a continuous loop that is less likely to be broken or compromised than a loop with a discontinuity meant for selective opening. In addition to coupling the pair of attachment loops 41 to the attachment means 31 via the pair of intermediate loops 33, the attachment loops can be coupled directly to the attachment means without the use of intermediate structure.

Figure 4:
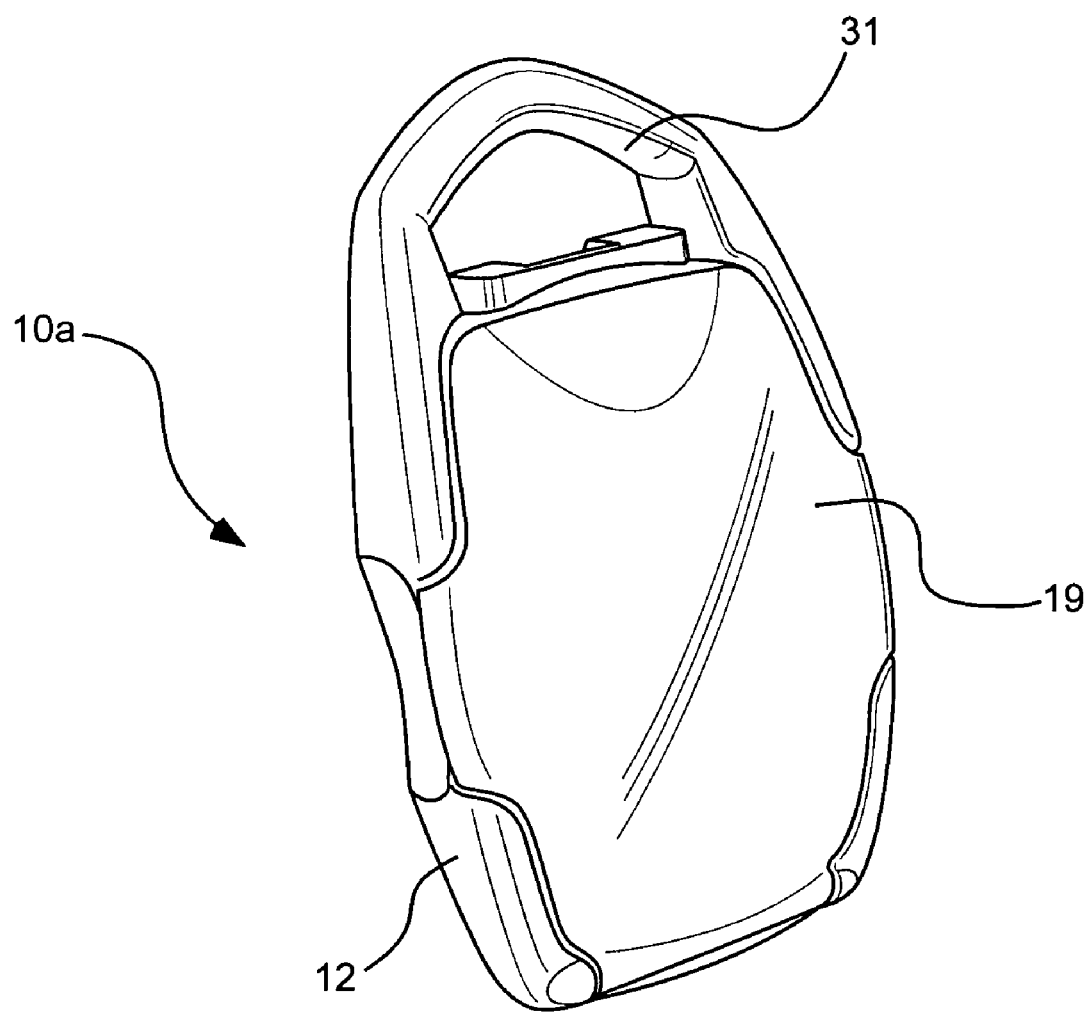
FIG. 4 is a perspective view of another information case in accordance with an aspect of the invention, the information case including only a single attachment point associated therewith.

FIG. 4 illustrates yet another embodiment of the invention in which the case 10a can be configured for use with an article (not shown) that includes structure to which the case can be attached. In this embodiment, the case includes only a single attachment means 31 on one end of the case. This embodiment can be particularly useful in situations where the case is meant to hang from an article, such as when the case is hung from a pull tab (not shown) of a zipper of an article of clothing. This embodiment can be advantageously attached to a zipper of a coat, jacket, backpack, suitcase or briefcase, for example, or from other similar structure such as cinch tassels of a hooded jacket. This embodiment shares many of the features described above in relation to the other embodiments of the invention.

Figure 5:
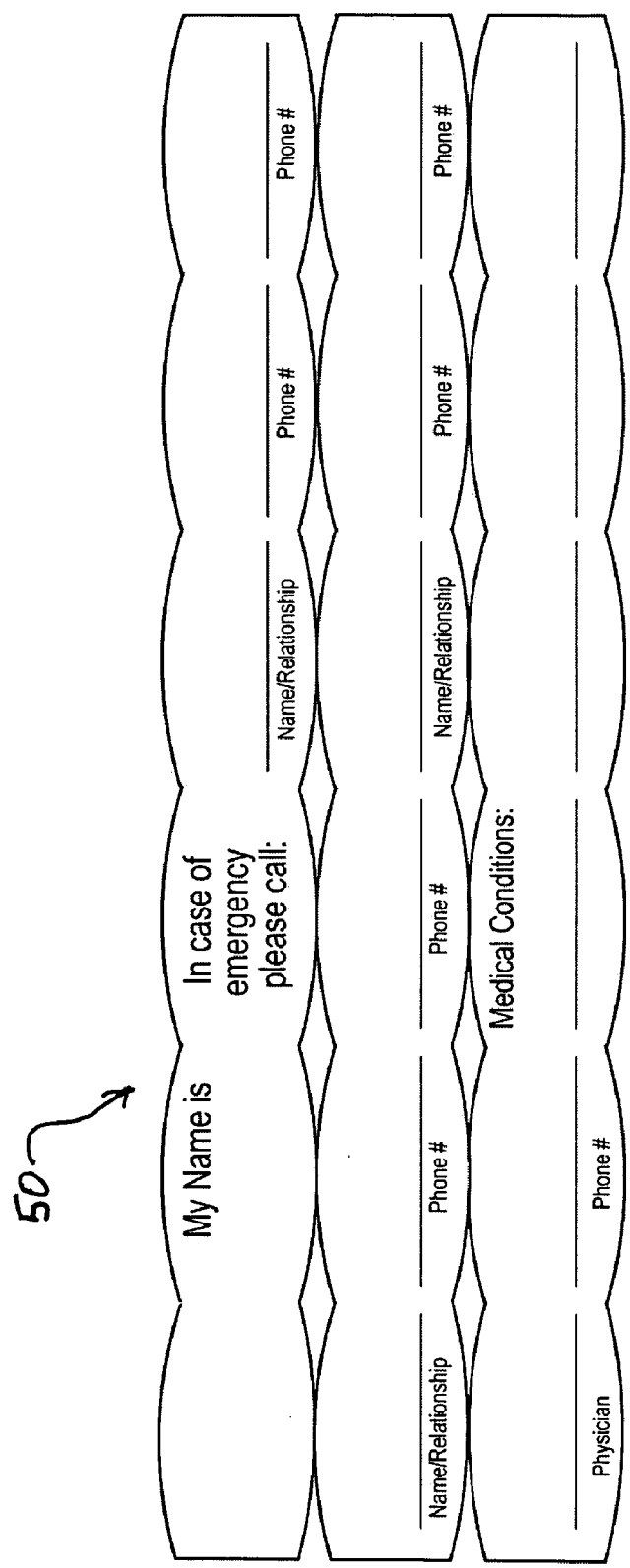
FIG. 5 is a schematic view of an exemplary information-bearing medium in accordance with an aspect of the invention.

One example of an information-bearing medium 50 in accordance with the invention is illustrated in FIG. 5. The medium can be formed of a variety of materials and can include a variety of devices or objects on which information can be disposed. The medium can be formed of paper, fabric, polymer materials, and specialized materials such as the material known as Tyvek®. In one aspect of the invention, the information-bearing medium can be substantially water resistant to ensure that the information related to the individual is not inadvertently washed or erased from the information-bearing medium. As used herein, the term "substantially water resistant" is understood to mean a condition in which the medium or device is not penetrated by moisture under normal atmospheric conditions.

As illustrated, the information-bearing medium 50 can include space for a variety of information to be disposed on the medium. In addition, as the medium is not dedicated to a "set" group of data, the information related to the individual can be updated to reflect current events. For instance, if the individual begins a new medication regiment, the medication information can be updated or changed. Similarly, if a child is left with a new, temporary daycare provider, the new information can be quickly added to the medium by the child's parent or guardian. Also, if a child is to participate in a "field-trip" or other activity for the day, temporary contact information can be added to the list, such as the name of a teacher or counselor in charge of the trip, transportation information, etc. In the event a family is on vacation and staying at a particular hotel, or with friends or family, the name and contact information for the hotel or friends or family can be added to the medium.

The information-bearing medium can disposed in the cavity 14 in a number of manners, and can be rolled, folded, accordion-folded, etc., to provide a medium that can be large enough to contain a great deal of information but can be folded or rolled into a sufficiently small size to fit within the cavity. The medium can be sized and shaped in a variety of manners, and in one aspect, the medium can include a strip of material formed of sections sized and shaped to conform to an interior shape of the cavity in which the medium is disposed. In this manner, the sections can be folded on top of each other to form a compact, folded medium shaped like the cavity that utilizes substantially all of the space in the cavity. In addition, adhesive can be provided on the medium to ensure that at least a portion of the medium is adhered to the body so that the medium will not become detached from the body.

In addition, a plurality of media can be supplied with each case or bracelet to allow a new medium to be used in the event the original medium becomes lost, worn or depleted of usable space on which information relating to the individual can be written or disposed. In addition, one or more substantially "blank" information-bearing media can be supplied with each bracelet to allow a user or owner of the bracelet to further customize the type of information disposed on the media.

In accordance with another aspect of the invention, a method for storing information related to an individual in a case wearable or bearable by the individual is provided, and can include the steps of: providing a substantially water-resistant information-bearing medium on which the information related to the individual can be disposed; storing the information-bearing medium within a cavity of the case defined between a body and a lid of the case; engaging a compliant latch and a retention nub of the body and lid with one another to secure the lid over the cavity in the body; and attaching the case to an article such that the case is worn or born by the individual.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. An information case for protectively storing information related to an individual, comprising:
   a base having a cavity defined therein, the cavity being configured to store and protect an information-bearing medium on which the information related to the individual can be disposed;
   a strap assembly having at least a strap member;
   attachment means for receiving the strap member, coupled to at least one end of the base;
   a lid having one of a retention nub and a compliant latch attached thereto, the lid being hingeably connected to the base; and
   another of the retention nub and the compliant latch being attached to the base and being configured to interlock with the retention nub or the compliant latch of the lid to provide selective closure of the lid over the cavity in the base.

2. The case of claim 1, wherein the retention nub is coupled to the lid and wherein the compliant latch is coupled to the base.

3. The case of claim 1, further comprising a living hinge formed intermediate the compliant latch and the base.

4. The case of claim 1, wherein the compliant latch is formed of a material having plastic memory.

5. The case of claim 1, wherein the retention nub includes a lip that can be frictionally engaged over the compliant latch.

6. The case of claim 1, wherein at least one of the base and the lid includes a seal, configured to provide a substantially water-resistant seal around at least a portion of a perimeter of the cavity.

7. The case of claim 1, further comprising an information-bearing medium, and wherein the information-bearing medium is substantially water resistant.

8. The case of claim 7, wherein the information related to the individual includes information selected from the group consisting of: identification information; health information; medication information; scheduling information; and third party contact information.

9. An information case for protectively storing information related to an individual, comprising:
   a base having a cavity defined therein, the cavity being configured to store and protect an information-bearing medium on which the information related to the individual can be disposed;
   attachment means for attaching the case to an article, coupled to at least one end of the base;
   a lid having one of a retention nub and a compliant latch associated therewith, the lid being hingeably connected to the base; and
   another of the retention nub and the compliant latch being connected to the base and being configured to interlock with the retention nub or compliant latch of the lid to provide selective closure of the lid over the cavity in the base.

10. The information case of claim 9, wherein the attachment means is coupleable to a pull tab of a zipper closure of an article.

11. The information case of claim 10, wherein the attachment means is coupled to only one end of the base.

12. The information case of claim 9, wherein the attachment means is coupled to each of opposing ends of the base and further comprising a pair of attachment loops coupled to the attachment means, the attachment loops being configured to be interlaced within straps or laces of an article.

13. The information case of claim 12, wherein the attachment loops each form a closed loop.

14. The information case of claim 9, wherein the attachment means is coupled to each of opposing ends of the base and further comprising an attachment strap coupled to the attachment means, the case and the attachment strap collectively comprising a bracelet configured to be attached about a wrist or an ankle of a wearer.

15. The information case of claim 9, wherein the retention nub is coupled to the bracelet lid and wherein the compliant latch is coupled to the base.

16. The information case of claim 9, further comprising a living hinge formed intermediate the compliant latch and the base.

17. The information case of claim 16, wherein the living hinge is formed of a material having plastic memory.

18. The information case of claim 9, wherein the retention nub includes a lip that can be frictionally engaged over the compliant latch.

19. The information case of claim 9, wherein at least one of the base and the lid includes a seal, configured to provide a substantially water-resistant seal around at least a portion of a perimeter of the cavity.

20. The information case of claim 9, wherein the information-bearing medium is substantially water resistant.

* * * * *